United States Patent
Nakayama

(10) Patent No.: US 12,491,672 B2
(45) Date of Patent: Dec. 9, 2025

(54) SCREW ADJUSTMENT METHOD IN THERMOSETTING RESIN INJECTION MOLDING MACHINE

(71) Applicant: THE JAPAN STEEL WORKS, LTD., Tokyo (JP)

(72) Inventor: Kiyotaka Nakayama, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 148 days.

(21) Appl. No.: 18/617,395

(22) Filed: Mar. 26, 2024

(65) Prior Publication Data

US 2024/0326305 A1    Oct. 3, 2024

(30) Foreign Application Priority Data

Mar. 27, 2023   (JP) .................. 2023-049833

(51) Int. Cl.
*B29C 45/76*    (2006.01)

(52) U.S. Cl.
CPC .. *B29C 45/766* (2013.01); *B29C 2945/76083* (2013.01); *B29C 2945/76187* (2013.01); *B29C 2945/76568* (2013.01); *B29C 2945/76665* (2013.01)

(58) Field of Classification Search
CPC ........ B29C 45/766; B29C 2945/76083; B29C 2945/76187
See application file for complete search history.

(56) References Cited

U.S. PATENT DOCUMENTS 6,042,362 A    3/2000   Mitsui

FOREIGN PATENT DOCUMENTS

| JP | 11-216754 A | 8/1999 | |
| JP | 2012192694 A | * 10/2012 | ............. B29C 45/50 |
| JP | 5647044 B2 | * 12/2014 | ............. B29C 45/50 |

* cited by examiner

*Primary Examiner* — James Sanders
(74) *Attorney, Agent, or Firm* — Sughrue Mion, PLLC

(57) ABSTRACT

A screw adjustment method in a thermosetting resin injection molding machine including a cylinder having a nozzle at a tip end of the cylinder and a screw accommodated in the cylinder. The screw adjustment method includes: contacting a screw and nozzle including bringing a tip end surface of the screw into contact with a tip end inner surface of an inner peripheral surface of the nozzle; moving the screw backward by a specified length after the contacting of the screw and the nozzle; and determining a screw position of the screw moved backward as a most forward position of the screw in a molding cycle.

12 Claims, 7 Drawing Sheets

US 12,491,672 B2

SCREW ADJUSTMENT METHOD IN THERMOSETTING RESIN INJECTION MOLDING MACHINE

CROSS-REFERENCE TO RELATED APPLICATIONS

This application is based on and claims priority under 35 USC 119 from Japanese Patent Application No. 2023-049833 filed on Mar. 27, 2023, the entire content of which is incorporated herein by reference.

TECHNICAL FIELD

The present disclosure relates to a screw adjustment method in an injection molding machine for injecting a thermosetting resin, a thermosetting resin injection device, and a thermosetting resin injection molding machine.

BACKGROUND

A thermosetting resin injection molding machine for injecting a thermosetting resin as an injection material includes a mold clamping device and an injection device, for example, as described in JPH11-216754A. The injection device includes a cylinder, a screw accommodated in the cylinder, and a screw driving device that drives the screw while supporting the cylinder. The cylinder is heated to a temperature at which the thermosetting resin is not cured in the cylinder, and the screw is rotated. Then, the thermosetting resin melts and is fed to the front of the screw, and the screw moves backward. That is, the thermosetting resin is metered. When the screw is driven in an axial direction, a mold clamped by the mold clamping device is filled with the thermosetting resin. The mold is heated to cure the thermosetting resin. When the resin is cured, the mold is opened and a molded article is taken out.

SUMMARY

When the thermosetting resin is injected in a molding cycle, the screw is driven to a most forward position to inject the thermosetting resin into the mold to avoid occurrence of insufficient filling of the resin. However, if the most forward position is not appropriately adjusted, inconvenience occurs. For example, when the most forward position is not set sufficiently forward, even if the screw is driven to the most forward position, a large gap is formed between an inside of a nozzle provided at a tip end of the cylinder and a tip end portion of the screw, and an amount of remaining resin increases. Thus, the resin remains in the cylinder until a next molding cycle, which is not preferable in terms of quality. On the other hand, when the most forward position is adjusted forward, a tip end surface of the tip end portion of the screw comes into contact with a tip end inner surface inside the nozzle when the screw is driven to the most forward position.

Illustrative aspects of the present disclosure provide a screw adjustment method that can appropriately adjust a most forward position of a screw in a thermosetting resin injection molding machine, a thermosetting resin injection device in which a most forward position of a screw is appropriately adjusted, and a thermosetting resin injection molding machine. Other problems and novel features will become apparent from description of the present description and the accompanying drawings.

One illustrative aspect of the present disclosure provides a screw adjustment method in a thermosetting resin injection molding machine including a cylinder having a nozzle at a tip end of the cylinder and a screw accommodated in the cylinder, the screw adjustment method including: contacting a screw and nozzle including bringing a tip end surface of the screw into contact with a tip end inner surface of an inner peripheral surface of the nozzle; moving the screw backward by a specified length after the contacting of the screw and the nozzle; and determining a screw position of the screw moved backward as a most forward position of the screw in a molding cycle.

According to the illustrative aspects of the present disclosure, the most forward position of the screw can be appropriately adjusted.

DETAILED DESCRIPTION

Figure 1:
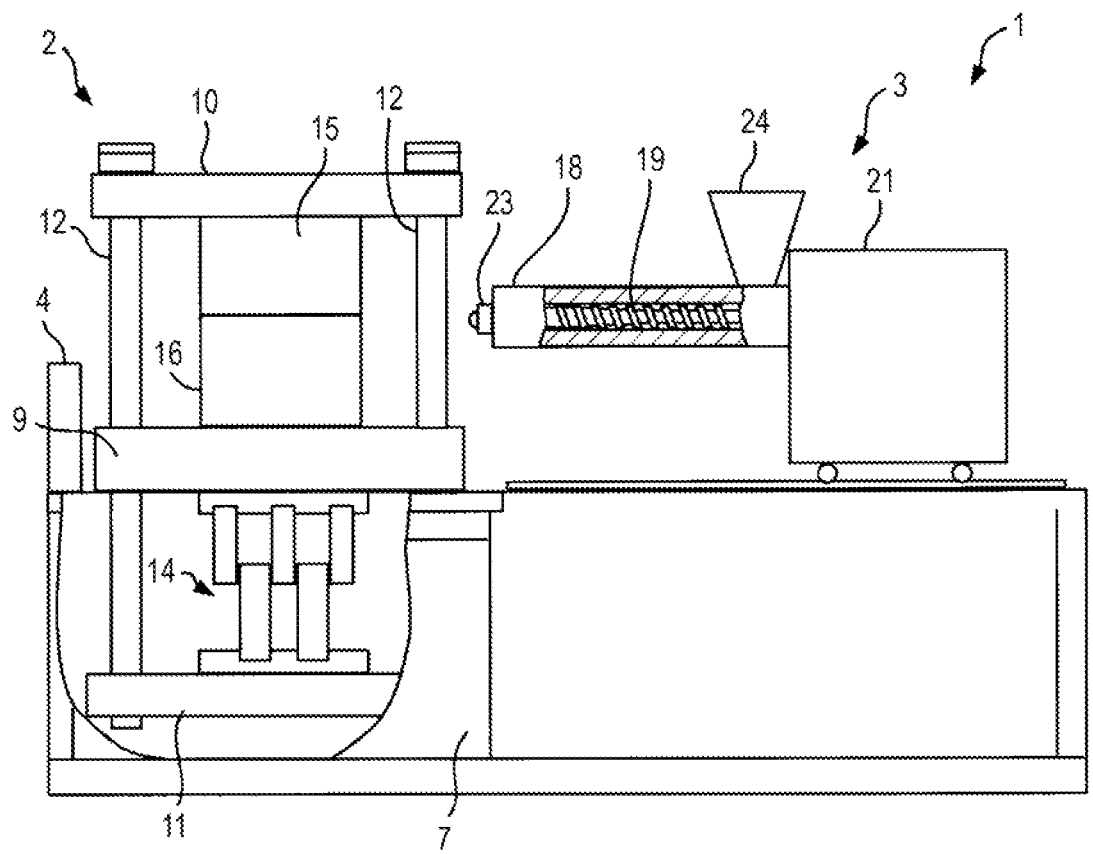
FIG. 1 is a front view of a thermosetting resin injection molding machine according to an illustrative embodiment.

Hereinafter, specific embodiments will be described in detail with reference to the drawings. However, the present invention is not limited to the following embodiment. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

Illustrative Embodiment

{Injection Molding Machine}

As shown in FIG. 1, a thermosetting resin injection molding machine 1 according to the illustrative embodiment includes a mold clamping device 2, a thermosetting resin injection device 3, and the like. As to be described in detail below, the mold clamping device 2 is of a vertical type in which a mold platen is vertically driven to open and close a mold. On the other hand, the thermosetting resin injection device 3 for injecting a thermosetting resin is of a horizontal type as to be described later. The thermosetting resin injection molding machine 1 includes a control device 4 for controlling these devices.

{Mold Clamping Device}

The mold clamping device 2 in the illustrative embodiment includes a fixed platen 9 fixed to a bed 7, an upper movable platen 10 provided above the fixed platen 9, and a lower movable platen 11 provided in the bed 7. The upper movable platen 10 and the lower movable platen 11 are coupled by a plurality of, for example, four tie bars 12, 12 . . . . A mold clamping mechanism is provided between the lower movable platen 11 and the fixed platen 9. The mold clamping mechanism in the illustrative embodiment is implemented by a toggle mechanism 14. An upper mold 15 is provided on the upper movable platen 10, and a lower mold 16 is provided on the lower movable platen 11. When the toggle mechanism 14 is driven, the upper mold 15 and the lower mold 16 are opened and closed. Although not shown in the figure, the upper mold 15 and the lower mold 16 are each provided with a temperature control device, temperatures of the upper mold 15 and the lower mold 16 are increased to cure the thermosetting resin.

{Thermosetting Resin Injection Device}

The thermosetting resin injection device 3 is of a horizontal type. The thermosetting resin injection device 3 is provided on the bed 7. The thermosetting resin injection device 3 includes a cylinder 18 provided horizontally, a screw 19 accommodated in the cylinder 18, and a screw driving device 21 that supports the cylinder 18 and is configured to drive the screw 19. The screw driving device 21 will be described in detail below. A nozzle 23 is provided at a tip end of the cylinder 18. A hopper 24 is provided at a rear part of the cylinder 18. When the nozzle 23 touches the molds 15, 16, an injection material made from the thermosetting resin can be injected to the molds 15, 16.

{Screw Driving Device}

Figure 2:
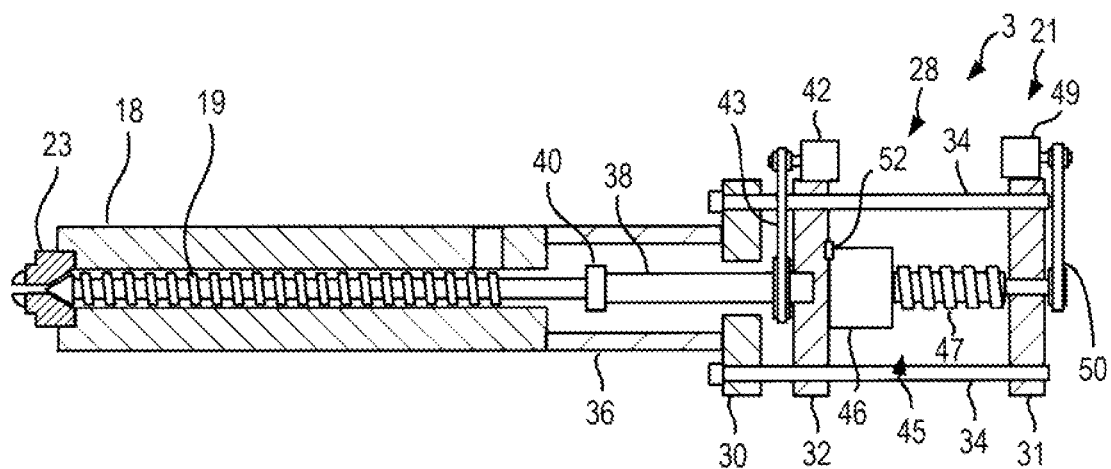
FIG. 2 is a front cross-sectional view of a thermosetting resin injection device according to the illustrative embodiment.

As shown in FIG. 2, the screw driving device 21 includes a frame 28. The frame 28 includes a front plate 30, a rear plate 31, and an injection plate 32. The front plate 30 and the rear plate 31 are coupled by a plurality of, for example, four guide rods 34, 34 . . . , and the injection plate 32 is penetrated by these guide rods 34, 34 . . . . That is, the injection plate 32 is guided by the guide rods 34, 34 . . . to move forward and backward. A hollow nose portion 36 is provided on the front plate 30 of the frame 28. The cylinder 18 is fixed to the nose portion 36 by bolts or the like.

A rotating shaft 38 is provided in the injection plate 32. The rotating shaft 38 is rotatably supported by the injection plate 32 at one end portion thereof. The rotating shaft 38 extends forward through the front plate 30. The screw 19 is connected to the other end portion of the rotating shafts 38 via a coupling 40. A plasticizing motor 42 is provided on the injection plate 32. The plasticizing motor 42 is configured to rotate the rotating shaft 38 via a rotation transmission mechanism 43. That is, when the plasticizing motor 42 rotates, the rotating shaft 38 and the screw 19 are rotated.

A ball screw mechanism 45 is provided between the injection plate 32 and the rear plate 31. Specifically, a ball nut 46 is fixed to the injection plate 32, and a ball screw 47 is rotatably provided on the rear plate 31. An injection motor 49 is provided on the rear plate 31, and rotates the ball screw 47 via a rotation transmission mechanism 50. Accordingly, when the injection motor 49 rotates, the ball screw 47 is rotated and the ball screw mechanism 45 extends and contracts. That is, the injection plate 32 moves forward and backward, and the screw 19 moves forward and backward.

A load cell 52 is provided between the injection plate 32 and the ball nut 46. Accordingly, an axial force acting on the screw 19 is detected. As to be described later, in a screw adjustment method according to the illustrative embodiment, a backward movement of the screw 19 is detected. The backward movement of the screw 19 can be detected based on a change in the axial force detected by the load cell 52.

The injection motor 49 is provided with an encoder. A rotational position of the injection motor 49 is detected by the encoder. Accordingly, magnitude of extending and contracting of the ball screw mechanism 45 is detected, and a screw position of the screw 19 is detected. That is, a screw position detection unit is provided. The backward movement of the screw 19 may be detected by the screw position detection unit.

{Screw Adjustment Method}

Figure 3A:
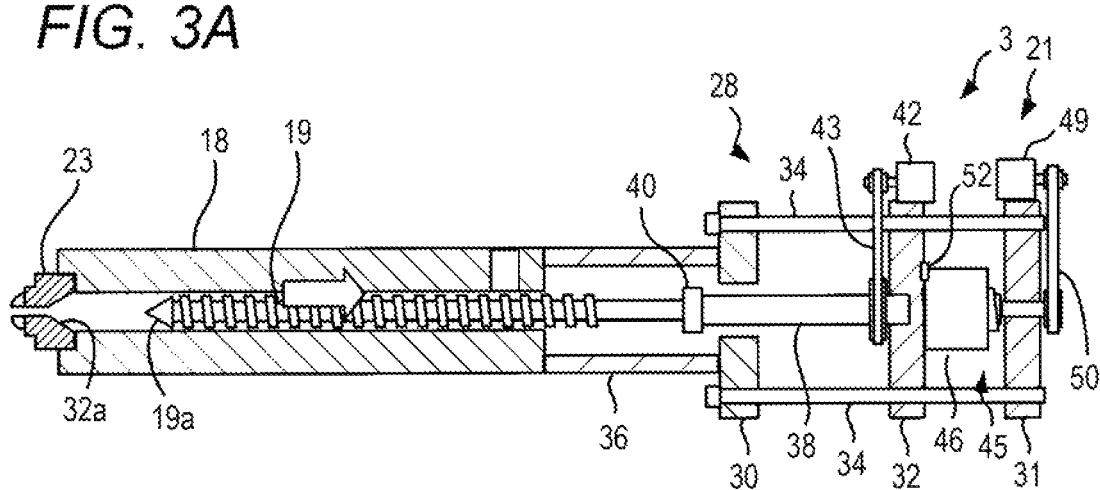
FIG. 3A is a front cross-sectional view of the thermosetting resin injection device according to the illustrative embodiment in which a screw adjustment method according to the illustrative embodiment is performed.

The screw adjustment method according to the illustrative embodiment will be described. The screw adjustment method according to the illustrative embodiment is an adjustment method for appropriately adjusting the most forward position of the screw 19 in the molding cycle. The most forward position is a screw position of the screw 19 at the time of completion of injection. When the screw 19 is adjusted to an appropriate most forward position, a specified gap is formed between a tip end inner surface of an inner peripheral surface of the nozzle 23 and a tip end surface of a tip end portion of the screw 19 at the time of completion of injection. An amount of the thermosetting resin remaining in the cylinder 18 at the time of completion of injection can be reduced, and heat generation due to contact between the tip end inner surface of the nozzle 23 and the tip end surface of the tip end portion of the screw 19 can be prevented, and quality deterioration of the thermosetting resin can be prevented. The specified gap is preferably from 0.4 mm to 0.7 mm. A tip end inner surface 23a of the nozzle 23 and a tip end surface 19a of the tip end portion of the screw 19 are shown in FIG. 3A. In the illustrative embodiment, the tip end inner surface 23a is formed in a conical concave surface, and the tip end surface 19a is formed in a conical surface.

Figure 3B:
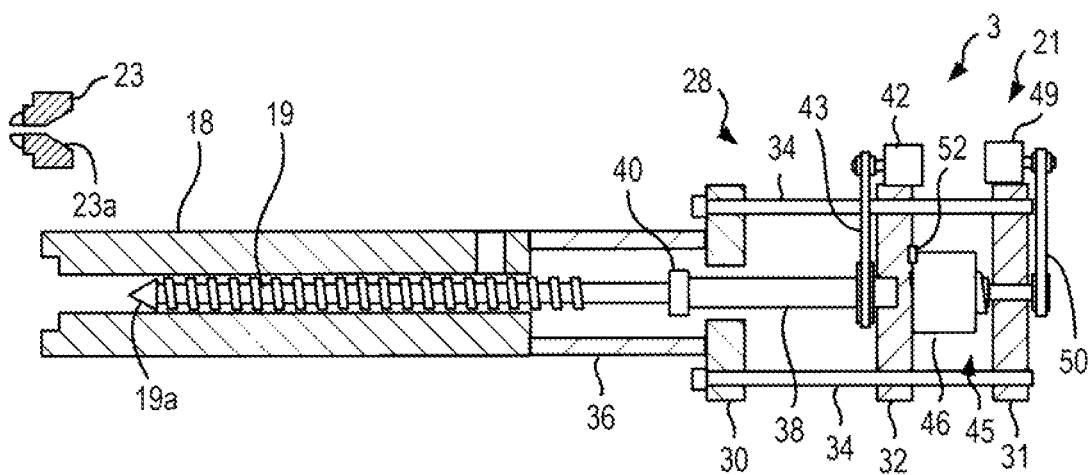
FIG. 3B is a front cross-sectional view of the thermosetting resin injection device according to the illustrative embodiment in which the screw adjustment method according to the illustrative embodiment is performed.
Figure 4:
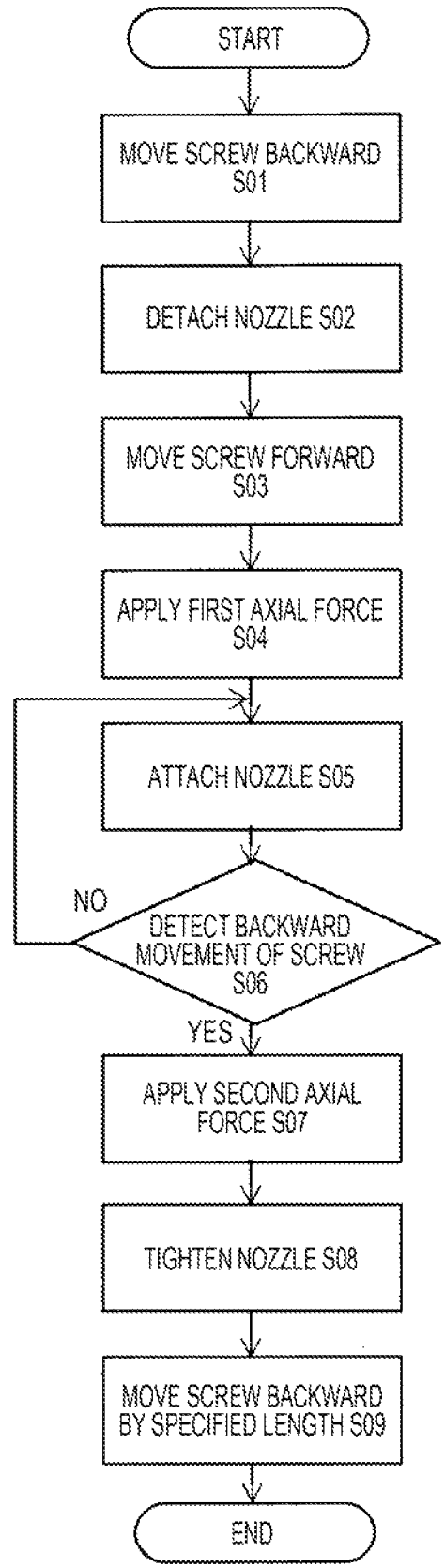
FIG. 4 is a flowchart of the screw adjustment method according to the illustrative embodiment.

In the screw adjustment method according to the illustrative embodiment, first, the screw is moved backward (step S01), as shown in FIG. 4. When the control device 4 (see FIG. 1) is operated, as shown in FIG. 3A, the injection motor 49 is driven to move the screw 19 backward. Next, as shown in FIG. 4, the nozzle is detached (step S02). As shown in FIG. 3B, an operator detaches the nozzle 23 from the cylinder 18. A male thread is formed on an outer peripheral surface of the nozzle 23, and a female thread is formed on a tip end portion of the cylinder 18. The nozzle 23 is rotated and detached. A reason why step S01 is performed in advance is to prevent the tip end inner surface 23a of the nozzle 23 and the tip end surface 19a of the tip end portion of the screw 19 from colliding with each other and being damaged when the nozzle 23 is detached in step S02.

Figure 3C:
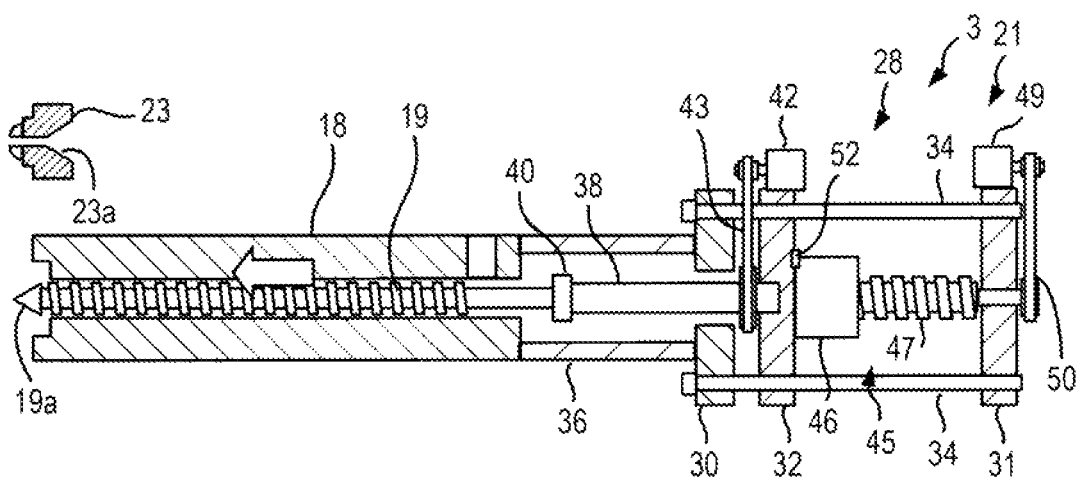
FIG. 3C is a front cross-sectional view of the thermosetting resin injection device according to the illustrative embodiment in which the screw adjustment method according to the illustrative embodiment is performed.

As shown in FIG. 4, the screw is moved forward (step S03). When the control device 4 (see FIG. 1) is operated, as shown in FIG. 3C, the injection motor 49 is driven to move the screw 19 forward. Accordingly, the tip end surface 19a of the tip end portion of the screw 19 is exposed from the tip end of the cylinder 18. The screw 19 moves forward such that the tip end surface 19a is sufficiently exposed.

Figure 3D:
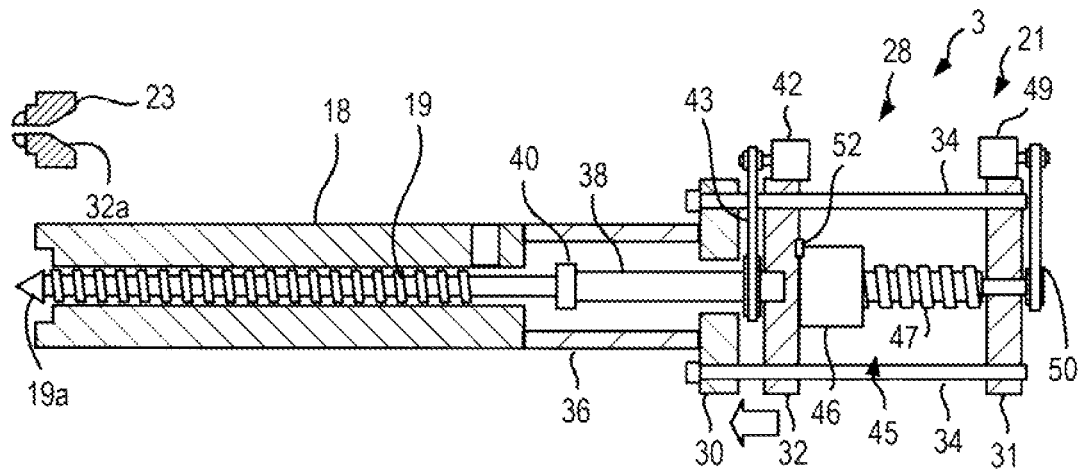
FIG. 3D is a front cross-sectional view of the thermosetting resin injection device according to the illustrative embodiment in which the screw adjustment method according to the illustrative embodiment is performed.

The control device 4 (see FIG. 1) is operated to select a screw adjustment mode. Then, the control device 4 automatically starts step S04 to be described below. Predetermined steps are sequentially performed until the operator notifies the control device 4 of completion of the work after completion of step S08. When the screw adjustment mode is selected in the control device 4, the control device 4 performs first axial force application (step S04). Specifically, the injection motor 49 starts torque control with a relatively small torque to generate a weak axial force in a forward direction, that is, a first axial force on the screw 19. The first axial force is adjusted to, for example, about 100 N. This state is shown in FIG. 3D.

Figure 3E:
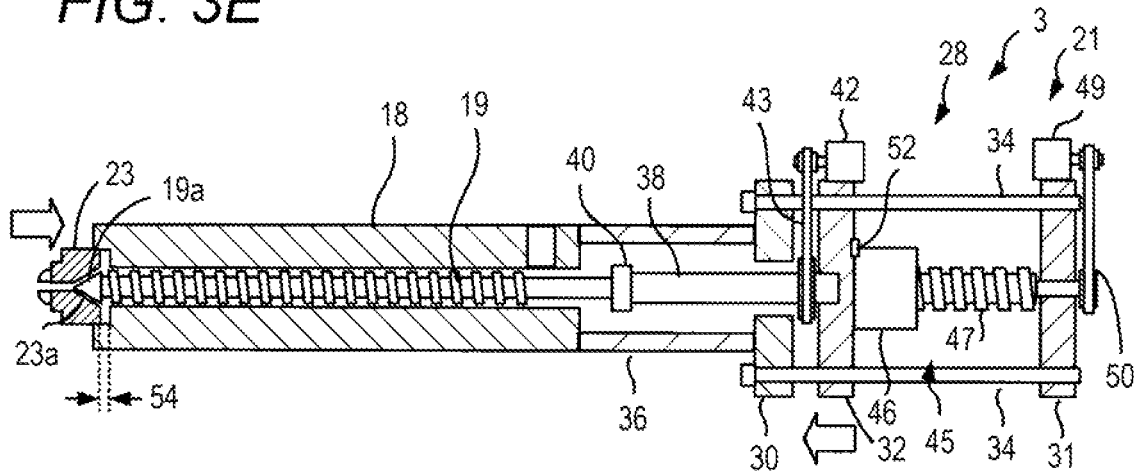
FIG. 3E is a front cross-sectional view of the thermosetting resin injection device according to the illustrative embodiment in which the screw adjustment method according to the illustrative embodiment is performed.

In a state where the first axial force is applied to the screw 19, the nozzle is attached (step S05) as shown in FIG. 4. That is, as shown in FIG. 3E, the operator attaches the nozzle 23 to the tip end of the cylinder 18. The nozzle 23 may be attached by any means, but the nozzle 23 is preferably rotated by hand. This is because the nozzle 23 can be attached to the cylinder 18 with a relatively small torque at the beginning of the attachment, which is efficient. When the nozzle 23 is rotated, the tip end surface 19a of the tip end portion of the screw 19 eventually comes into contact with the tip end inner surface 23a of the nozzle 23. Thus, a torque required to rotate the nozzle 23 temporarily increases. However, since the first axial force applied to the screw 19 is relatively small, the nozzle 23 can be slightly rotated. A state in which a small gap 54 is formed between the nozzle 23 and the cylinder 18 is shown.

As shown in FIG. 4, the control device 4 monitors the backward movement of the screw 19 (step S06). The backward movement of the screw 19 can be detected by various methods. For example, a method is to detect a change in the axial force measured by the load cell 52. Another method is to monitor the presence or absence of the backward movement of the screw 19 by monitoring the encoder of the injection motor 49. When the tip end inner surface 23a of the nozzle 23 comes into contact with the tip end surface 19a of the tip end portion of the screw 19, a change in the axial force is detected. When the nozzle 23 is rotated after the contact, the screw 19 is moved backward, which is detected by the encoder. The detection may be performed by any method. The control device 4 monitors the backward movement of the screw 19 and allows the operator to continue performing step S05 while the backward movement is not detected (NO). When the backward movement of the screw 19 is detected (YES), the control device 4 performs the next step S07.

Figure 3F:
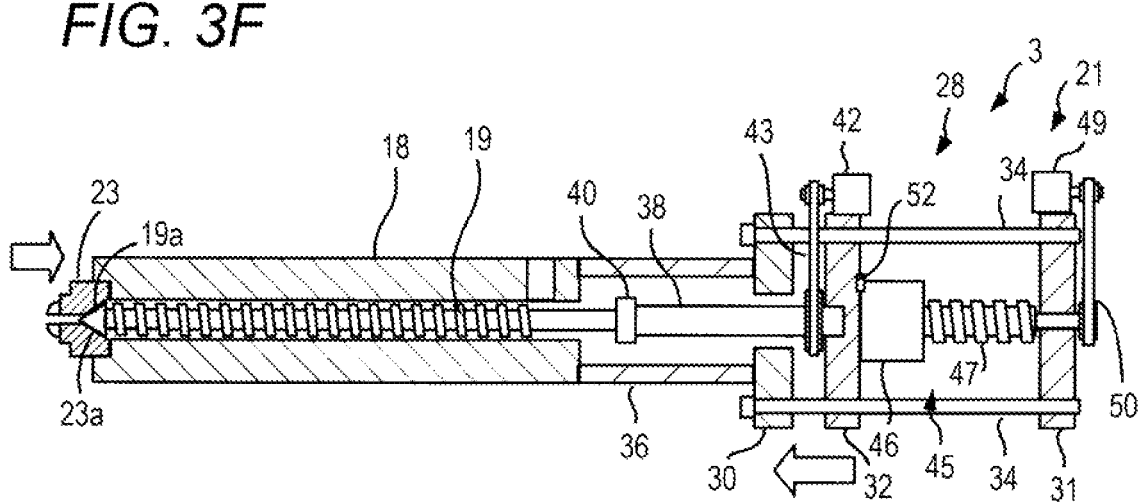
FIG. 3F is a front cross-sectional view of the thermosetting resin injection device according to the illustrative embodiment in which the screw adjustment method according to the illustrative embodiment is performed.

The control device 4 performs second axial force application (step S07). The torque control of the injection motor 49 is performed to increase the torque to a slightly higher torque, and a slightly larger axial force in the forward direction, that is, a second axial force is generated on the screw 19. The second axial force is larger than the first axial force, and is adjusted to, for example, about 20 kN. This state is shown in FIG. 3F. When the second axial force is applied to the screw 19, the nozzle 23 cannot be rotated and tightened by hand. The operator tightens the nozzle 23 using a spanner (step S08). When the nozzle 23 is tightened in a state where the tip end inner surface 23a of the nozzle 23 and the tip end surface 19a of the tip end portion of the screw 19 are in contact with each other, the screw 19 is also moved backward due to the tightening of the nozzle 23.

Figure 5:
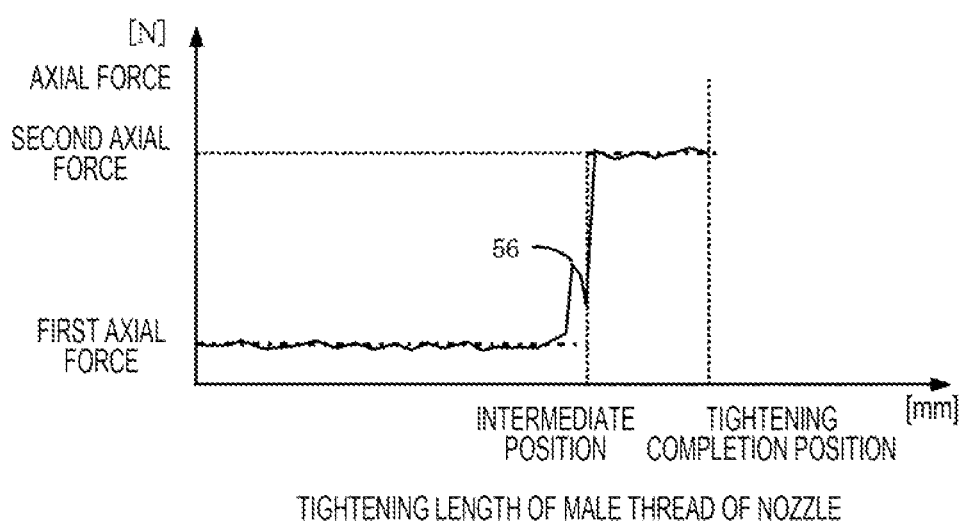
FIG. 5 is a graph showing an axial force of a screw detected when the screw adjustment method according to the illustrative embodiment is performed.

A graph of FIG. 5 shows the axial force on the screw 19 detected in the load cell 52 in step S05 to step S08. That is, when the nozzle 23 is attached by hand in a state where the first axial force is applied to the screw 19 first, an axial force close to the first axial force is detected in the load cell 52. As the male thread of the nozzle 23 is tightened, the axial force increases as indicated by the reference numeral 56. That is, the tip end inner surface 23a of the nozzle 23 comes into contact with the tip end surface 19a of the tip end portion of the screw 19. As described above, the control device 4 switches to the second axial force. Thereafter, when tightening the nozzle 23 by the spanner, the nozzle 23 cannot be tightened eventually. That is, a state of reaching a tightening completion position is shown.

Figure 3G:
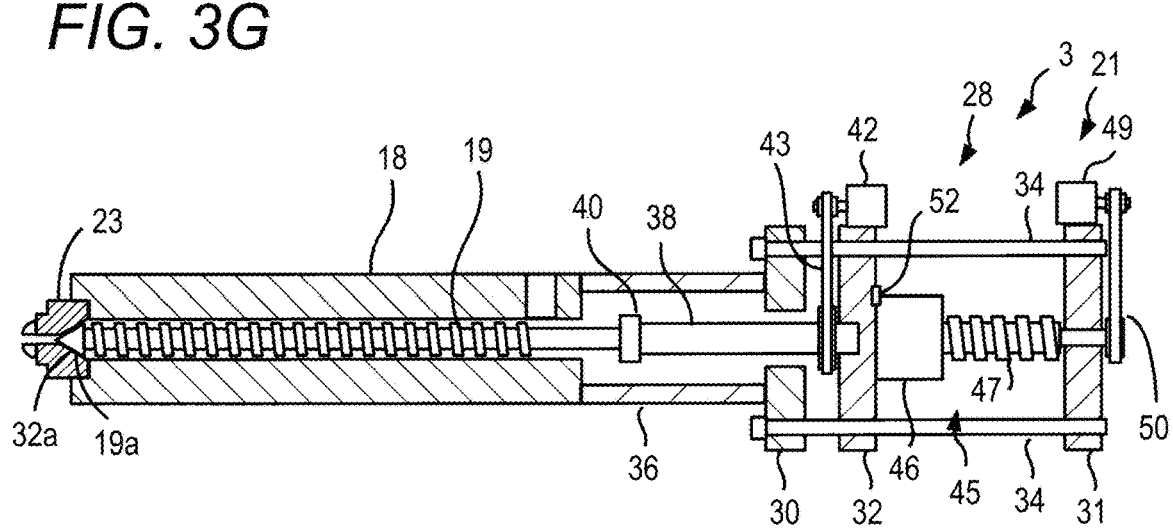
FIG. 3G is a front cross-sectional view of the thermosetting resin injection device according to the illustrative embodiment in which the screw adjustment method according to the illustrative embodiment is performed.
Figure 3H:
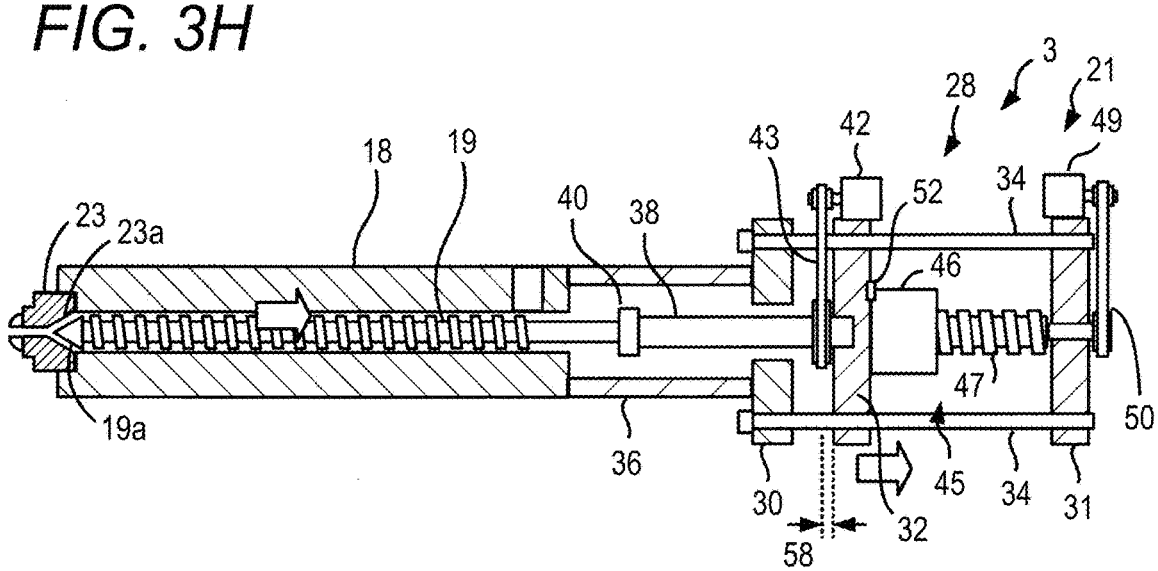
FIG. 3H is a front cross-sectional view of the thermosetting resin injection device according to the illustrative embodiment in which the screw adjustment method according to the illustrative embodiment is performed.

FIG. 3G shows a state in which the tightening of the nozzle 23 is completed and the tightening completion position is reached. The operator operates the control device 4 (see FIG. 1) to inform the control device 4 of the completion of the work. The control device 4 performs step S09 as shown in FIG. 4. That is, the screw is moved backward by a specified length. Specifically, the injection motor 49 is driven to move the screw 19 backward by a specified length. The specified length is preferably 0.4 mm to 0.7 mm, and is 0.5 mm, for example. This state is shown in FIG. 3H. The backward movement length is indicated by the reference numeral 58. The control device 4 stores a current screw position of the screw 19 as the most forward position. The screw adjustment mode is completed.

Figure 3I:
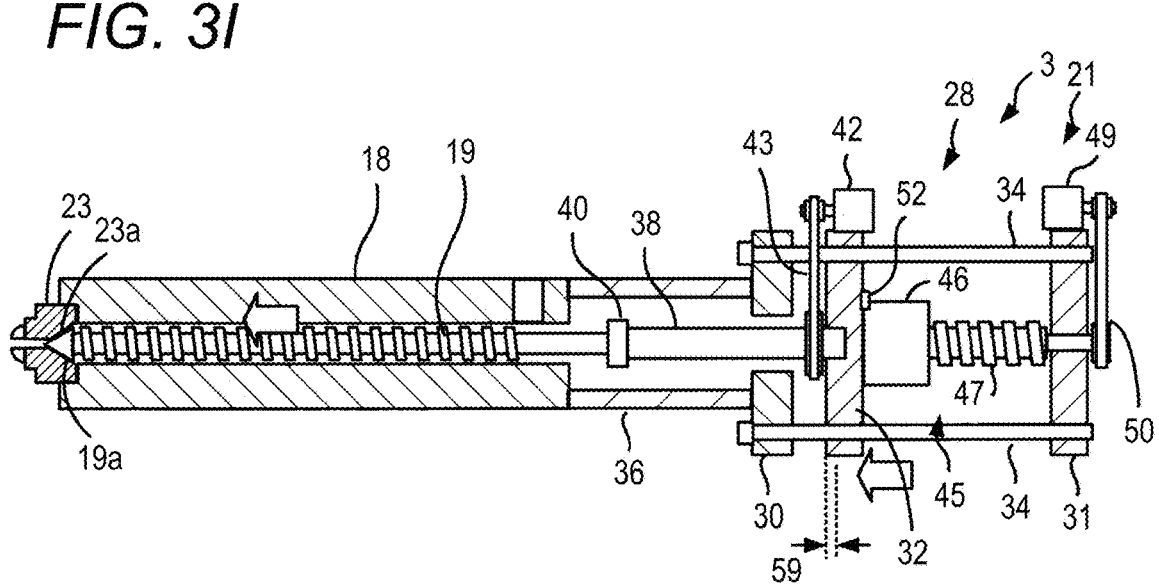
FIG. 3I is a front cross-sectional view of the thermosetting resin injection device according to the illustrative embodiment in which the screw adjustment method according to the illustrative embodiment is performed.

The control device 4 may perform a confirmation operation upon completion of the screw adjustment mode. Specifically, after step S09 is completed, the injection motor 49 is driven to drive the screw 19 forward by a specified length 59, as shown in FIG. 3I. The injection motor 49 is driven to confirm the contact between the tip end inner surface 23a of the nozzle 23 and the tip end surface 19a of the tip end portion of the screw 19. The contact is detected by the load cell 52. After the confirmation, as shown in FIG. 3H, the screw is moved backward by the specified length 58. By performing such a confirmation operation, the position of the screw 19 can be adjusted more accurately. The control device 4 completes the screw adjustment mode.

The screw adjustment method according to the illustrative embodiment includes: a screw and nozzle contact step of bringing the tip end surface 19a of the screw 19 into contact with the tip end inner surface 23a of the nozzle 23; and a screw specified-length backward movement step of moving the screw 19 backward by a specified length. Step S01 to step S08 described above correspond to the screw and nozzle contact step, and step S09 corresponds to the screw specified-length backward movement step. With such a configuration, the screw adjustment method according to the illustrative embodiment is simple and excellent in adjustment. Since the nozzle 23 is attached and then tightened to the cylinder 18 while switching the axial force applied to the screw 19 in the screw and nozzle contact step in two stages, that is, the first and second axial forces, the contact between the tip end inner surface 23a of the nozzle 23 and the tip end surface 19a of the screw 19 is ensured. That is, it is ensured that the most forward position of the screw 19 can be accurately adjusted.

{Screw Adjustment Method According to Comparative Example}

Figure 6A:
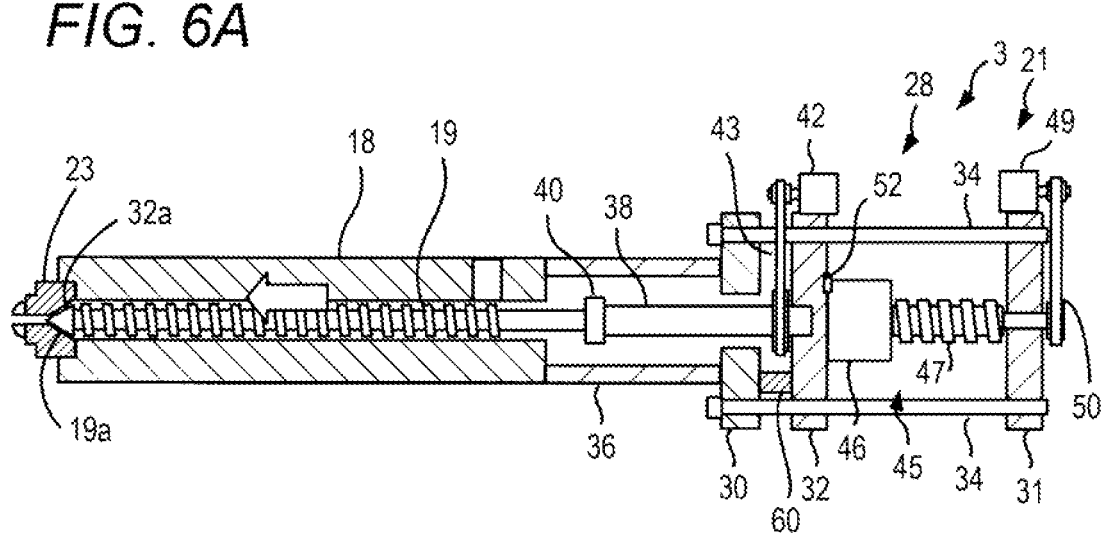
FIG. 6A is a front cross-sectional view of the thermosetting resin injection device according to the illustrative embodiment in which a screw adjustment method according to a comparative example is performed.

Although being different from the screw adjustment method according to the illustrative embodiment, other methods of adjusting the most forward position of the screw 19 are also considered. In a screw adjustment method according to a comparative example, the most forward position can be adjusted as follows, for example. First, as shown in FIG. 6A, the injection motor 49 is driven to move the screw 19 forward, and the tip end inner surface 23a of the nozzle 23 and the tip end surface 19a of the tip end portion of the screw 19 are brought into contact with each other. In this state, a stopper 60 is placed between the front plate 30 and the injection plate 32 to prevent the injection plate 32 from further moving forward. Alternatively, the stopper 60 may be provided on the front plate 30 to perform length adjustment of the stopper 60. A screw position of the screw 19 at this time is set in the control device 4 (see FIG. 1) as the most forward position.

Figure 6B:
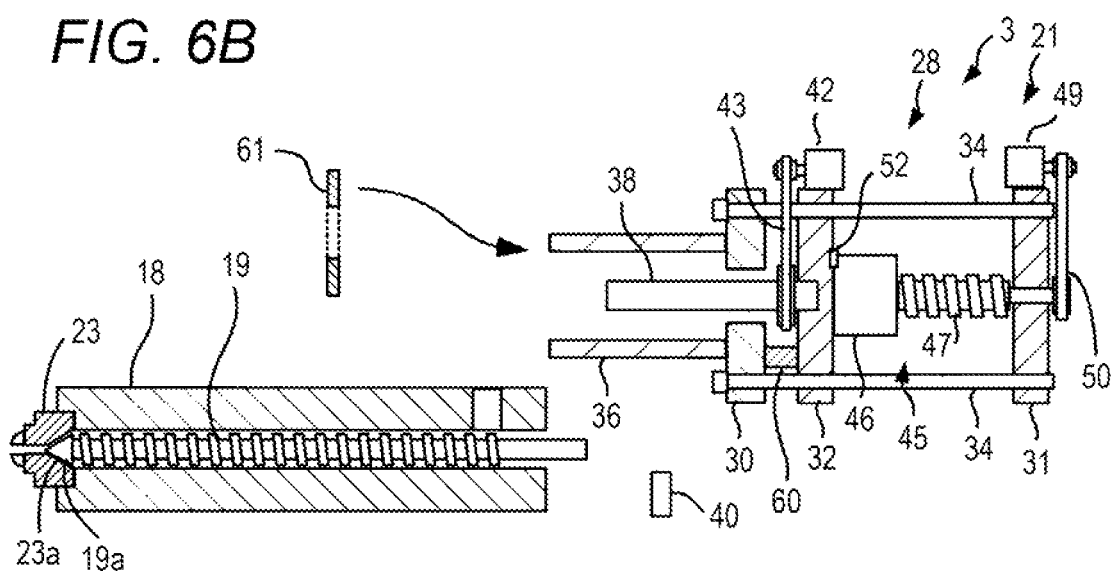
FIG. 6B is a front cross-sectional view of the thermosetting resin injection device according to the illustrative embodiment in which the screw adjustment method according to the comparative example is performed.
Figure 6C:
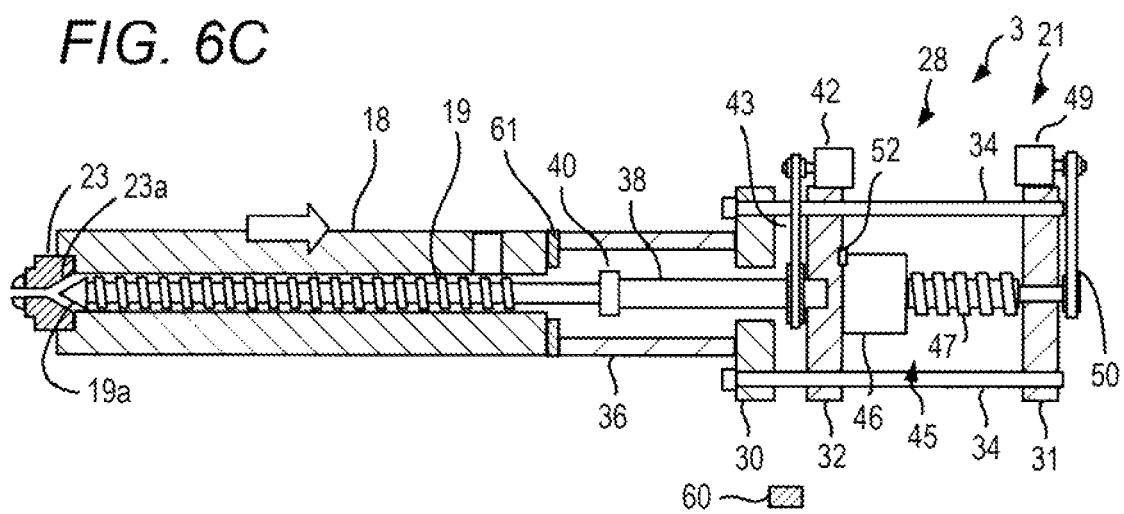
FIG. 6C is a front cross-sectional view of the thermosetting resin injection device according to the illustrative embodiment in which the screw adjustment method according to the comparative example is performed.

Next, as shown in FIG. 6B, the coupling 40 is detached to separate the screw 19 from the rotating shaft 38, and the cylinder 18 is detached from the nose portion 36. A shim 61 is attached to the nose portion 36 from which the cylinder 18 is detached. Finally, as shown in FIG. 6C, the cylinder 18 is attached to the nose portion 36 with the shim 61 interposed therebetween, and the screw 19 and the rotating shaft 38 are connected to the coupling 40. The stopper 60 is detached. The screw adjustment method according to the comparative example is completed.

When the screw adjustment method according to the comparative example is performed, even if the screw 19 is moved forward to the most forward position set in the control device 4, a gap between the tip end inner surface 23a of the nozzle 23 and the tip end surface 19a of the tip end portion of the screw 19 is secured by a thickness of the shim 61. That is, as long as the thickness of the shim 61 is adjusted to the specified length, the most forward position can be appropriately adjusted. However, it is necessary to detach the cylinder 18 from the nose portion 36, attach the shim 61, and attach the cylinder 18 again, making the work complicated. It can be said that the screw adjustment method according to the illustrative embodiment is superior.

Modification to Illustrative Embodiments

The illustrative embodiment can be variously modified. For example, it has been described that the encoder of the injection motor 49 is used as the position detection unit of the screw 19. However, by installing a magnetostrictive linear position sensor, for example, between the injection plate 32 and another plate, such as the front plate 30, it becomes possible to detect the position of the screw 19. Although it has been described that the nozzle 23 is attached to the cylinder 18 while the axial force acting on the screw 19 is switched in two stages, that is, the first and second axial forces, the axial force may be applied only in one stage. Alternatively, the axial force may be switched in three or more stages.

The mold clamping device 2 can also be modified. In the illustrative embodiment, it has been described that the mold clamping device 2 is of a vertical type, but may be of a horizontal type. Similarly, although it has been described that the thermosetting resin injection device 3 is of a horizontal type, but may be of a vertical type.

Although the invention made by the present inventors is specifically described based on the embodiments, it is needless to say that the present invention is not limited to the embodiments described above, and various modifications can be made without departing from the gist of the invention. The plurality of examples described above may be appropriately combined.

What is claimed is:

1. A screw adjustment method in a thermosetting resin injection molding machine including a cylinder having a nozzle at a tip end of the cylinder and a screw accommodated in the cylinder, the screw adjustment method comprising:
   contacting a screw and nozzle including bringing a tip end surface of the screw into contact with a tip end inner surface of an inner peripheral surface of the nozzle;
   moving the screw backward by a specified length after the contacting of the screw and the nozzle; and
   determining a screw position of the screw moved backward as a most forward position of the screw in a molding cycle;
   wherein the contacting of the screw and the nozzle includes:
   detaching the nozzle from the cylinder;
   moving the screw forward;
   detecting a screw backward movement including attaching the nozzle to the cylinder in a state where an axial force in a forward direction is applied to the screw and detecting a backward movement of the screw.

2. The screw adjustment method according to claim 1, wherein the specified length is in a range of 0.4 mm to 0.7 mm.

3. The screw adjustment method according to claim 1, wherein the tip end inner surface of the nozzle is formed in a conical concave surface,
   wherein the tip end surface of the screw is formed in a conical surface, and
   wherein the screw and nozzle contact step is to bring the conical surface into contact with the conical concave surface.

4. The screw adjustment method according to claim 1, wherein a male thread is formed on the nozzle, and the nozzle is attached to the cylinder by being screwed into a female thread formed on the cylinder,
   wherein the detecting of the screw backward movement includes a first step and a second step,
   the first step including attaching the nozzle to the cylinder with a first torque in a state where a first axial force is applied to the screw, and
   the second step including tightening the nozzle with respect to the cylinder with a second torque larger than the first torque in a state where a second axial force larger than the first axial force is applied to the screw.

5. The screw adjustment method according to claim 1, wherein in the detecting of the screw backward movement, the backward movement of the screw is detected by monitoring the axial force acting on the screw when the nozzle is attached to the cylinder and detecting an increase in the axial force.

6. The screw adjustment method according to claim 1, wherein in the detecting of the screw backward movement, the backward movement of the screw is detected by a screw position detector that is configured to detect a position of the screw.

7. A thermosetting resin injection device comprising:
   a cylinder provided horizontally and having a nozzle at a tip end of the cylinder;
   a screw configured to be driven in a horizontal direction in the cylinder;
   a screw driving device configured to drive the screw; and
   a control device,
   wherein a most forward position of the screw in a molding cycle is set in the control device, the most forward position being a screw position obtained by moving the screw backward by a specified length from a nozzle and screw contact state where a tip end surface of the screw is in contact with a tip end inner surface of an inner peripheral surface of the nozzle;
   wherein the nozzle and screw contact state is provided by:
      detaching the nozzle from the cylinder;
      moving the screw forward;
      detecting a screw backward movement including attaching the nozzle to the cylinder in a state where an axial force in a forward direction is applied to the screw and detecting a backward movement of the screw.

8. The thermosetting resin injection device according to claim 7, wherein the specified length is in a range of 0.4 mm to 0.7 mm.

9. The thermosetting resin injection device according to claim 7,
   wherein the tip end inner surface of the nozzle is formed in a conical concave surface, and
   wherein the tip end surface of the screw is formed in a conical surface.

10. A thermosetting resin injection molding machine comprising:
    a mold clamping device;
    an injection device including:
       a cylinder provided horizontally and having a nozzle at a tip end of the cylinder;
       a screw configured to be driven in a horizontal direction in the cylinder; and
       a screw driving device configured to drive the screw; and
    a control device,
    wherein a most forward position of the screw in a molding cycle is set in the control device, the most forward position being a screw position obtained by moving the screw backward by a specified length from a nozzle and screw contact state where a tip end surface of the screw is in contact with a tip end inner surface of an inner peripheral surface of the nozzle;
    wherein the nozzle and crew contact state is provided by:
       detaching the nozzle from the cylinder;
       moving the screw forward;
       detecting a screw backward movement including attaching the nozzle to the cylinder in a state where an axial force in a forward direction is applied to the screw and detecting a backward movement of the screw.

11. The thermosetting resin injection molding machine according to claim 10, wherein the specified length is in a range of 0.4 mm to 0.7 mm.

12. The thermosetting resin injection molding machine according to claim 10,
    wherein the tip end inner surface of the nozzle is formed in a conical concave surface, and
    wherein the tip end surface of the screw is formed in a conical surface.

* * * * *